3,075,623
SPRAG-CLUTCH AND RETAINER STRUCTURE
Johan Lund, Detroit, Mich., assignor to Formsprag Company, Warren, Mich., a corporation of Michigan
Filed July 11, 1960, Ser. No. 42,127
8 Claims. (Cl. 192—45.1)

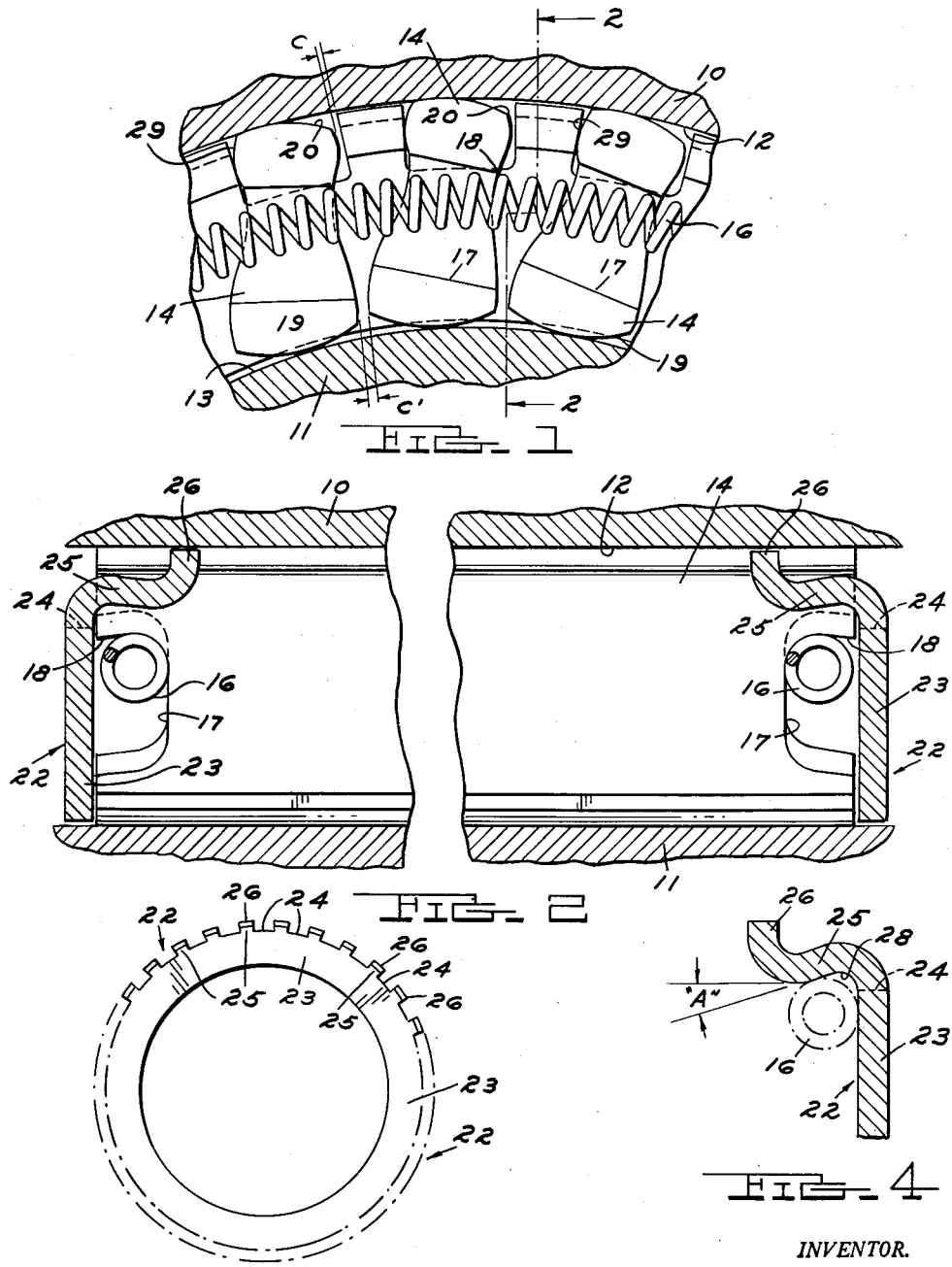

The present invention relates to improvements in a sprag-clutch and retainer structure or assembly, and more particularly to retainer provisions whereby the clutch is enabled to operate ideally under a vibratory load condition, especially when the clutch is of light weight construction. The component sprags of the assembly also have features of structural novelty adapting the same for improved coaction with the retainer means.

Sprag clutches working under vibratory conditions, in particular light weight designs, have many times failed because of insufficient load transmitting capacity, not because the clutch was under-designed as to its load transmitting sprags, but due to the fact that only a small number of sprags out of the entire number properly engage the clutch races and assume the load. Under the vibratory condition, the sprags dance and jump about, rather than maintaining a proper sliding engagement along the axial length thereof with one of the races, so that when the load is applied only part thereof may grippingly engage the race previously engaged slidingly, the remaining sprags simply failing to take hold. As indicated above, the condition is especially encountered in light weight clutch constructions, such as in aircraft designs, and has represented a continuing problem to sprag clutch designers and engineers.

Sprag type clutches featuring a circumferential series of like sprags engageable between and against coaxially, radially spaced races, with the sprags mechanically separated from one another by a retainer which controls the same in their clutching and de-clutching action, are well known in the art. However, the sprag retaining device of such clutches is usually a unitary one, ordinarily featuring a pair of axially spaced ring-like elements held in such spacing by cross pieces or bars between which the radially inner or outer ends of the individual sprags are received and controlled.

It is evident that a sprag retainer of this type is subject to the disadvantage that it must be tailor-made as to axial length for the particular axial length of the sprags confined between its annular end members or rings and radially received between its circumferentially spaced cross bars. Each clutch, in order to even approach acceptable operation, must have its sprags confined at their ends, with only necessary operating end clearance, by the annular end members of the retainer.

It is therefore a general object of the present invention to provide retainer means for a sprag-clutch of the overrunning type, in which the retainer means is constituted by two like end members having appropriate provision to center the same on one or the other of the clutch races, whereby these end members may be employed to retain and control sprags of various axial lengths, although otherwise identical in various clutches as to their other features, such as the contour of the inner and outer wedging faces thereof, the circumferential extent of these faces, and the like. Thus, in a considerable degree the improved clutch is standardized as to its retainer means.

Moreover, it is a further object of the invention to provide a sprag and retainer structure of this sort, in which the individual annular end members, preferably in the form of sheet metal stampings, have an improved cross sectional contour to facilitate the initial assembly of sprags thereof, as well as the usual annular garter spring means which function to urge the sprags normally against one of the clutch races.

To this end, the annular end members or retainer rings, as predeterminedly spaced axially from one another in accordance with the axial length of the sprags received therebetween, have integral, axially disposed sprag separating elements or legs provided with radially disposed extremities or toes adapted to center the members in relation to one of the clutch races when installed therebetween. The spacing toes are integrally connected to the annular, radially extending ring body portions by the sprag separating elements, and the latter are axially and radially inclined at a negative rake, so that each element affords a channel outline in which a portion of one of two end garter springs is received upon initial assembly of the sprags and spring to the retainers, and prior to mounting between the clutch races. The springs and rings thus hold all components in the initial assembly.

When the clutch unit is installed between the clutch races, with the garter springs radially retracted in consequence, the latter are automatically placed out of position for possible snagging or binding engagement with the sprag spacing elements, such as would destroy the desired free and independent working of the springs.

Yet another object is to provide an overrunning clutch including individually standardized retainer stampings as described, in which sprags of a series spaced by the retainers are contoured in an improved manner for coaction with the latter. To this end, one radial end of each sprag which is received between successive spacer elements or legs of the respective axially spaced retainer rings is dimensioned in the circumferential sense to work between those legs with only a slight circumferential clearance, in effect representing a manufacturing tolerance or clearance; while the opposite radial ends of the respective sprags are contoured in a greater circumferential width, sufficient to occupy circumferential space along the adjacent race including the width of theoretical radial projections of the circumferential width of the spacer elements or toes at the other sprag ends. This enables the successive wider sprag ends to operate in a relatively close circumferential spacing relative to one another; and as a result the sprags themselves prevent their angular skewing adjacent the last named race in the operation of the clutch, yet are permitted to "breathe" adequately for proper operation.

It follows that the sprags may work entirely freely and independently of one another, as guided by the race members between whose spacer elements or legs they are received with relatively close circumferential clearance, and as mutually controlled by one another. Undesired non-uniform pushing of one sprag by another, with resultant tendency to burn, is prevented.

In general, it is an object to provide an improved sprag clutch, in which the tendency of the sprags, or at least a part of the annular series thereof, to jump or dance about under a vibratory, non-load transmitting phase of operation, so as not to uniformly and properly engage between races when load is applied, is eliminated by thoroughly disciplining or taming the sprags. To this end they are positioned between a pair of like, independent and independently acting retainer rings at opposite axial ends of the sprags, and between circumferentially spaced, axially inwardly extending spacer legs of such rings, with annular spring means coacting with the sprags in a manner to cause the same, even under a high frequency vibrating condition, to maintain proper sliding engagement with one of the races until load is assumed. This entails, as an important feature of the invention, the provision of a proper and relatively small circumferential clearance between the sprags and the retainer's spacer leg elements, i.e., sufficiently small to properly discipline the sprags, yet adequate to permit the individual sprags to operate or breathe freely.

It follows that, due to the very independence itself of the action of the individual retainer elements, and the individual springs coacting therewith in controlling the sprags, the successive sprags tend to be uniformly maintained in line sliding engagement, along the axial length thereof, with one of the clutch races, even under vibration, and that all sprags instantaneously and uniformly resume gripping engagement with that race when the load is applied. The result is that excessive skewing of the sprags is reduced; the sprags are properly confined under individual retainer action, yet are free to move to some extent or breathe; the sprags are tamed and caused to work in unison; and, in consequence, that the real capacity of the clutch is fully utilized, the sprags are more uniformly loaded, and that assured performance is had.

The foregoing as well as other objects will become more apparent as this description proceeds, especially when considered in connection with the accompanying drawings illustrating the invention, wherein:

FIG. 1 is a fragmentary view in transverse cross section normal to the axis of an overrunning clutch incorporating features of the invention;

FIG. 2 is a fragmentary view in section along broken line 2—2 of FIG. 1;

FIG. 3 is an end view, partially broken away, of a pair of the improved individual sprag retainer members in accordance with the invention, sprags, races and sprag energizing springs having been omitted for clarity;

FIG. 4 is a fragmentary view in axial section similar to FIG. 2 through one of the retainer rings, indicating the spring retaining action of the latter afforded by the negative rake of a portion thereof.

As illustrated in FIGS. 1 and 2, the reference numerals 10 and 11 designate conventional coaxial and axially telescoped outer and inner clutch races, respectively, presenting concentric, radially spaced race surfaces 12, 13 between which a series of wedging elements or sprags 14 work in a relatively close circumferential spacing. The action of the sprags 14 in clutchingly engaging and disengaging between the races 12, 13 is conventional, and will be well understood by those skilled in the art.

Thus, assuming the inner race 11 to be a driver, the individual sprags will be tilted in a counterclockwise sense to take wedging engagement between the inner race surface 13 and the outer race surface 12 to drive race 10; and when the angular speed of the latter exceeds that of the driver 11, the race 12 will overrun and slidingly engage the outer sprag ends. The sprags 14 are normally urged against the outer race by a pair of annular coiled garter springs 16 received in end recesses 17 of the respective sprags, in a known manner, the springs 16 being expansive in character and bearing outwardly against outer edges 18 of the sprags to bias the latter in the direction for race engagement.

As thus far described, the clutch structure is conventional. However, it will be observed that the radially inner race engaging portion or radially inner end of each sprag is, adjacent its arcuate race engaging surface 19, of greater width across its circumferential dimension than the outer radial portion or end of the sprag, i.e., adjacent the arcuate race engaging surface 20 thereof and across its corresponding circumferential dimension. The effect of these dimensional modifications of existing sprag structure, in relation to the general dimensions of the clutch, and to the sprag retainer means of the invention, will be described.

The retaining means in question is constituted solely by a pair of like annular retainer members or rings 22 preferably formed as sheet metal stampings. Each comprises a radially extending annular flat body element or member 23 whose radial dimension occupies a major portion of the space between races 10, 11. Such body portion terminates radially outwardly at the inner root portions 24 separating successive axially inturned legs or spacer portions 25, between which the outer radial ends of the sprags 14 are received.

Spacer portions 25 are inturned axially and inclined radially inwardly at acute angles to the respective radial body portions, i.e., at a negative rake, represented by the angle "A" (FIG. 4) between the horizontal and the line of inclination of the spacer portions or legs 25, which is of slight angularity.

Spacer portions 25 terminate in radially outturned centering elements or toes 26, the radius of which approximates that of the outer clutch race surface 12, so that the retainer rings 22 are centered on the latter with only a running clearance. The rings 22 are at their inner periphery spaced from the inner race surface 13 with a more generous radial clearance.

It is seen from the foregoing that the rings 22, in any given cross section as to radial dimension, circumferential dimension at their successive spacer portions 25, and circumferential spacing between such portions, i.e., across the root edges 24, will accommodate sprags of any desired axial length which are appropriately designed in regard to their radial and circumferential contour to coact with the spacer rings. In other words, the spacer means of the invention, lacking cross members rigidly connected to its end rings, and featuring axial spacer portions 25 each of axial length substantially less than half that of the sprag, need not be specially tailor designed for only a given length of sprag 15. This standardization as to design is an important improvement afforded by the invention.

It will be noted by reference to FIG. 4 of the drawings that the negative rake of the sprag spacer portions 25 of each end ring member 22 provides a depressed channel 28 in which the respective annular garter springs 16 may be received, in a free and radially expanded condition of the same, as when the sprags 14 and springs are inwardly assembled axially between rings 22, with the outer portions of the sprags projecting between successive cross spacer members 25.

In assembling the sprags 14, the springs 16 and rings 22, one such ring, with the expanding garter spring inserted in its negative rake channel 28 and thus held in the channel (as indicated in FIG. 4), is lowered axially into the annular space between the clutch races 12, 13. The sprags are then set, one by one, in between the retainer legs 25 of the positioned ring 22, being so manipulated in doing this that the greater spring 16 is compressed radially inwardly, and free of the negative rake channel, as shown in FIG. 2 of the drawings. With all of the sprags 14 in place the second retainer ring 22, with its garter spring positioned in its channel 28 as described, is set onto the ends of the sprags and snapped in place. This may call for a bit of care in locating the axial sprag ends between retainer spacing legs 25, since the sprags may be a bit out of proper axial line or pitch. It is, however, this very tendency to misalign which is corrected by the independently acting retainers 22 and the close circumferential clearances (see FIG. 1) between their spacing legs 25 and an adjacent sprag.

As illustrated in FIG. 1, the outer radial portions of the sprags are circumferentially dimensioned to fit between spacer elements 25 with a very limited clearance "C," normally represented by a manufacturing tolerance or clearance, so that the arcuate side surfaces 29 of the sprags may freely trunnion against the cross elements. The centers of the arcuate side faces 29 of the sprags are so located that maximum wearing surface is assured between these sides and the adjacent legs 25 of retainer rings 22.

The enlarged inner portions of the sprags are of sufficient circumferential dimension to occupy the projected space between cross members 25, enabling the sprags to operate closely yet freely relative to one another. The circumferential clearance at such spaces is designated "C'" in FIG. 1.

While it is recognized that under varying vibratory conditions as to frequency and amplitude, the load carrying capacity on various sprags of the assembly may be varyingly approached, within relatively slight ranges, however, tests run both in laboratory and field on a number of clutches incorporating the features of independent retaining action and close discipling of sprag action under vibration have shown very gratifying results, indeed, representing out-performance of existing conventional sprag clutches of like size and rating.

The advantage of the improved retainer design in standardizing retainer structure for sprags of different axial length, but otherwise of like cross sectional design, is believed to require no further discussion. However, the action of the independent sprag confining and disciplining rings 22 may require some explanation.

It is the generally held opinion of sprag engineers that unless the retainer washer or ring components of any sprag retainer are rigidly linked together, as by cross bars of full axial length, a skewing effect on the sprags, particularly under vibration, will take place. However, by closely observing the relationship of the sprags to the races and the energizing effect on the sprags, it will be found that the sprags always seek to contact the races properly, i.e., in line engagement along the length thereof. For example, if a sprag were cut in two at its axial middle, each garter spring 16 would force a section of the sprag into engagement with both races, being located by a retainer ring and having no alternative.

The effect is the same in the case of a one-piece sprag independently retained and energized by the same forces at each axial end thereof. The independence of action takes advantages of the natural tendency of the sprag to align properly, and consequently the entire axial length of the sprag will be disciplined, with a tendency to properly slide on a race prior to imposition of load. Should one sprag, for one reason or another, tend to skew, it would, by reason of the close sprag-retainer leg clearance "C," have to move all the other sprags, including one of the retainer rings 22, an effort exceeding the sprag's ability to accomplish under vibration. Clutches in accordance with the present disclosure have been subjected to thousands of engaging strokes under full load with no indication of skewing.

What I claim as my invention is:

1. A sprag clutch assembly to operate between clutch races, comprising a circumferential series of axially extending sprags having radially inner and outer race engaging surfaces, and retainer means directly engageable with and controlling movement of said sprags, said retainer means comprising a pair of structurally independent annular members disposed axially outwardly relative to the axial midpoints of the sprags, each of said members have a radially extending body portion and a plurality of circumferentially successive spacer portions extending axially inwardly from said body portion between sprags of said series, said spacer portions of the retainer members being of axial length no more than half that of the sprags.

2. A sprag clutch assembly to operate between clutch races, comprising a circumferential series of axially extending sprags having radially inner and outer race engaging surfaces, and retainer means directly engageable with and controlling movement of said sprags, said retainer means comprising a pair of like and structurally independent annular members disposed axially outwardly of the respective axial ends of the sprags, each of said members having a radially extending body portion and a plurality of circumferentially successive spacer portions extending axially inwardly from said body portion between corresponding radial ends of successive sprags of said series, said spacer portions of the retainer members being of axial length no more than half that of the sprags.

3. A sprag clutch assembly to operate between clutch races, comprising a circumferential series of axially extending sprags having first and second radially spaced race engaging surfaces, and retainer means directly engageable with and controlling movement of said sprags, said retainer means comprising a pair of structurally independent annular members disposed axially outwardly of the respective axial ends of the sprags, each of said members having a radially extending body portion and a plurality of circumferentially successive spacer portions extending axially inwardly from said body portion between corresponding portions of successive sprags of said series which are adjacent the respective first race engaging surfaces of the sprags, said spacer portions being of axial length not more than half that of the sprags, the portions of said sprags adjacent the respective second race engaging surfaces being of greater circumferential extent than the portions adjacent said respective first race engaging surfaces to occupy circumferential spaces between said races which are represented by theoretical radial projections of said spacer portions of said retainer members.

4. A sprag clutch assembly to operate between clutch races, comprising a circumferential series of axially extending sprags having radially inner and outer race engaging surfaces, and retainer means directly engageable with and controlling movement of said sprags, said retainer means comprising a pair of structurally independent annular members disposed axially outwardly of the respective axial ends of the sprags, each of said members having a radially extending body portion and a plurality of circumferentially successive spacer portions extending axially inwardly from said body portion between corresponding radial ends of successive sprags of said series, said spacer portions having radially directed extremities for locating engagement with one of the races.

5. A sprag clutch assembly to operate between clutch races, comprising a circumferential series of axially extending sprags having radially inner and outer race engaging surfaces, retainer means directly engageable with and controlling movement of said sprags, and spring means biasing the sprags in one radial direction relative to a race, said retainer means comprising a pair of like structurally independent annular members disposed axially outwardly of the respective axial ends of the sprags, each of said members having a radially extending body portion and a plurality of circumferentially successive spacer portions extending axially inwardly from said body portion between corresponding radial ends of sprags of said series, said spacer portions being at an acute angle to the axes of respective members to define acutely angled channels between said respective spacer and body portions, said spring means comprising annular spring members received in and located by said respective channels.

6. A sprag clutch assembly to operate between clutch races, comprising a circumferential series of axially extending sprags having first and second radially spaced race engaging surfaces, retainer means directly engageable with and controlling movement of said sprags, and spring means biasing the sprags in one radial direction relative to a race, said retainer means comprising a pair of structurally independent annular members disposed axially outwardly of the respective axial ends of the sprags, each of said members having a radially extending body portion and a plurality of circumferentially successive spacer portions extending axially inwardly from said body portion between corresponding portions of successive sprags of said series which are adjacent the respective first race engaging surfaces of the sprags, said spacer portions being of axial length not more than half that of the sprags, said spacer portions being at an acute angle to the axes of respective members to define acutely angled channels between said respective spacer and body portions, said spring means comprising annular spring members received in and located by said respective channels, the portions of said sprags adjacent the respective second race engaging surfaces being of greater circumferential extent than the portions adjacent said respective first race engaging surfaces to occupy circumferential spaces between said races which are represented by theoretical radial projections of said spacer portions of said retainer members, said spacer portions having radially directed extremities for locating engagement with one of said races.

7. Sprag retainer and control means for a sprag clutch assembly adapted to operate between clutch races in direct engagement with sprags of said assembly, comprising a pair of like, structurally independent annular members each having a radially extending body portion and a plurality of circumferentially successive spacer portions extending axially from the body portion thereof toward the other body portion to receive sprags therebetween, said spacer portions being of an axial length not in excess of half that of the intended sprags.

8. Sprag retainer and control means for a sprag clutch assembly adapted to operate between clutch races in direct engagement with sprags of said assembly, comprising a pair of like, structurally independent annular members each having a radially extending body portion and a plurality of circumferentially successive spacer portions extending axially from the body portion thereof toward the other body portion to receive sprags therebetween, said spacer portions being at an acute angle to the axes of respective members to define acutely angled spring receiving channels between said respective spacer and body portions, said spacer portions having radially directed extremities for locating engagement with one of said races.

References Cited in the file of this patent

UNITED STATES PATENTS

| | | |
|---|---|---|
| 2,693,868 | Swenson | Nov. 9, 1954 |
| 2,912,086 | Troendly et al. | Nov. 10, 1959 |
| 2,954,855 | Lund | Oct. 4, 1960 |

FOREIGN PATENTS

| | | |
|---|---|---|
| 914,772 | France | July 1, 1946 |
| 721,095 | Great Britain | Dec. 29, 1954 |